(12) United States Patent
Subramanian et al.

(10) Patent No.: US 8,811,799 B2
(45) Date of Patent: Aug. 19, 2014

(54) SYSTEM FOR AND METHOD OF STORING SNEAK PEEKS OF UPCOMING VIDEO CONTENT

(75) Inventors: Ananthanarayanan Subramanian, Irving, TX (US); Venkata S. Adimatyam, Irving, TX (US); Qing Fan, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 415 days.

(21) Appl. No.: 12/624,030

(22) Filed: Nov. 23, 2009

(65) Prior Publication Data

US 2011/0123174 A1    May 26, 2011

(51) Int. Cl.
*H04N 9/80* (2006.01)

(52) U.S. Cl.
USPC ............................ 386/250; 386/230; 725/8

(58) Field of Classification Search
USPC .......................................... 386/230
See application file for complete search history.

(56) References Cited

U.S. PATENT DOCUMENTS

| | | | | |
|---|---|---|---|---|
| 7,263,709 B1 * | 8/2007 | Krapf | | 725/46 |
| 7,634,785 B2 * | 12/2009 | Smith | | 725/34 |
| 7,743,116 B2 * | 6/2010 | Goldeen et al. | | 709/219 |
| 7,817,995 B2 * | 10/2010 | Khurana et al. | | 455/420 |
| 2001/0003184 A1 * | 6/2001 | Ching et al. | | 707/4 |
| 2003/0093530 A1 * | 5/2003 | Syed | | 709/226 |
| 2003/0149975 A1 * | 8/2003 | Eldering et al. | | 725/34 |
| 2004/0107435 A1 * | 6/2004 | Anzai et al. | | 725/35 |
| 2007/0006255 A1 * | 1/2007 | Cain | | 725/36 |
| 2007/0014537 A1 * | 1/2007 | Wesemann et al. | | 386/95 |
| 2007/0067801 A1 * | 3/2007 | Monta et al. | | 725/44 |
| 2008/0103879 A1 * | 5/2008 | Armstrong | | 705/10 |
| 2009/0158325 A1 * | 6/2009 | Johnson | | 725/38 |
| 2010/0106800 A1 * | 4/2010 | Dewa | | 709/218 |

* cited by examiner

*Primary Examiner* — Thai Tran
*Assistant Examiner* — Jose Mesa

(57) ABSTRACT

A system for and method of storing sneak peeks of upcoming viewing content is presented. The system and method provides that the sneak peek clips may be recorded and stored onto a subscriber's digital video recorder (DVR) in response to a determination of the viewing preferences of the subscriber. The sneak peek clips may also be recorded and stored onto the subscriber's DVR in response to a user selection of content. The user may select content by browsing through a graphical user interface and indicating selections. The user may also select content when viewing a program by selecting an advertisement for an upcoming movie or series that the subscriber may be interested in viewing. The clips may be recorded and stored on the subscriber's DVR, and then later retrieved and viewed by using an interface to navigate and select the stored sneak peek clips. After viewing the sneak peek clips, the user may be provided with the option of viewing the content in full.

22 Claims, 7 Drawing Sheets

SYSTEM FOR AND METHOD OF STORING SNEAK PEEKS OF UPCOMING VIDEO CONTENT

BACKGROUND INFORMATION

Conventionally, some television and video content providers have provided recommendations to subscribers indicating certain television shows or movies that the subscriber may be interested in viewing. Conventional systems, however, do not provide the subscriber with a mechanism for getting a "sneak peek" of a movie or television series—in the form of a trailer, or a clip of predetermined length—by recording such a sneak peek and storing it on the subscriber's digital video recorder (DVR) for later retrieval and viewing.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

A system for and method of storing sneak peek clips of upcoming viewing content is presented. The system and method provides that the sneak peek clips may be recorded and stored onto a subscriber's digital video recorder (DVR) in response to a determination of the viewing preferences of the subscriber. The sneak peek clips may also be recorded and stored onto the subscriber's DVR in response to a user selection of content. The user may select content by browsing through a graphical user interface and indicating selections. The user may also select content when viewing a program by selecting an advertisement for an upcoming movie or series that the subscriber may be interested in viewing. The clips may be recorded and stored on the subscriber's DVR, and then later retrieved and viewed by using an interface to navigate and select the stored sneak peek clips. After viewing the sneak peek clips, the user may be provided with the option of viewing the content in full.

The description below describes servers, set top boxes (STBs), display devices, and network elements that may include one or more modules, some of which are explicitly shown in the figures, others that are not. As used herein, the term "module" may be understood to refer to computing software, embedded on a computer readable medium, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, STBs, display devices, and network elements, etc.) separately. The functions described as being performed at various components may be performed at other components, and the various components may be combined and/or separated. Other modifications also may be made.

Figure 1:
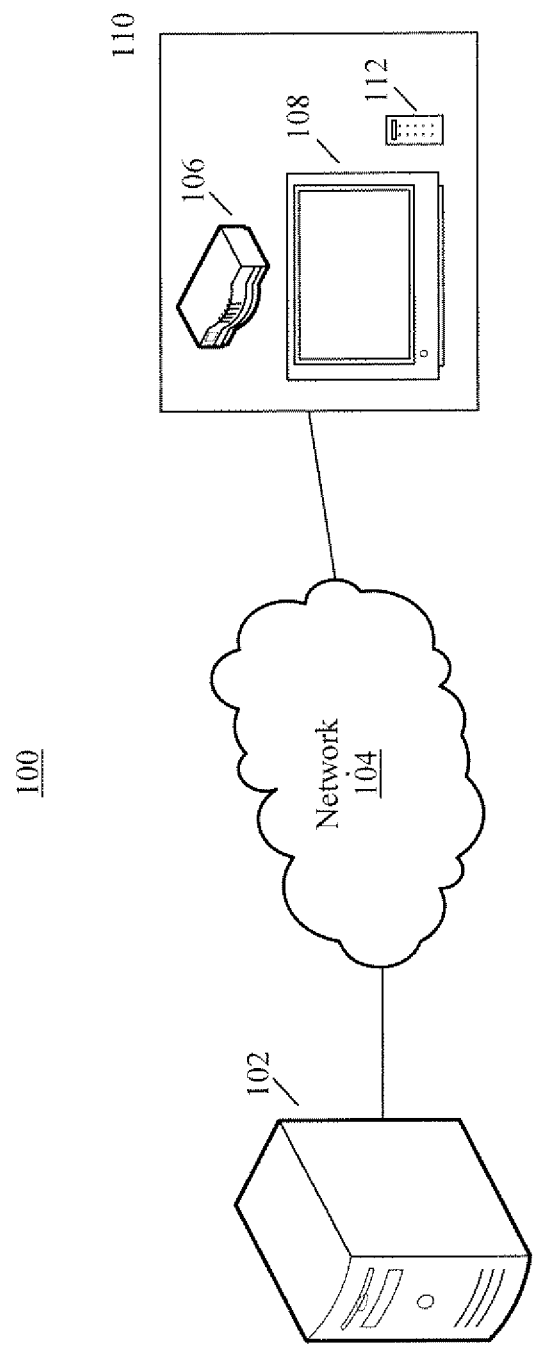
FIG. 1 is a schematic diagram illustrating a system for storing and facilitating viewing of sneak peeks of video content, in accordance with exemplary embodiments.

FIG. 1 is a schematic diagram illustrating a system for storing and facilitating viewing of sneak peeks of video content in accordance with exemplary embodiments The system 100 may provide the user with different graphical user interfaces (GUIs) to facilitate the selection of stored sneak peek content. For example the system 100 may allow the user to browse stored sneak peek content by various categories. The system 100 can facilitate the selection of stored sneak peek content by allowing a user to select an advertisement of a program as the advertisement is playing. Upon the selection of the advertisement by the user, the system may retrieve a clip or trailer of predefined length and store it in the DVR storage area for later viewing. The system 100 may also facilitate user searching of programs that they may be interested in viewing at a later date and then selecting those programs. The system 100 may then retrieve and store a clip or trailer of predefined length and store it in the DVR storage area for later viewing.

In exemplary embodiments, the system 100 may include a server 102 communicatively coupled to a network 104, and one or more STBs 106 communicatively coupled to the network 104. The network 104 may communicate content signals from the server 102 to the STBs 106. The server 102 may communicate the content signal to the STBs 106 via the network 104 individually or to the STBs 106 as a group or sub-group. The STBs 106 may be located at one or more user premises 110. In an exemplary embodiment, the server 102 may broadcast, multicast, and/or unicast the content signal.

The content signals may be, for example, television signals or audio signals that may be in digital or analog form, data, requests, other digital or analog information, or combinations thereof. The content signal also may include a plurality of channels, where the STB 106 may tune to a particular channel to display the video of the channel at a display device 108, as is well known in television systems. Additionally, the viewer may use a user input device 112 (e.g., remote control, computer keyboard, computer mouse, touchscreen, etc.) to control which channel the STB 106 causes display of the content at the display device 108. The content signal may be used to display content at the display device 108. Content may be video, audio, text, or other types of video or audio information. It is noted that the input device 112 may be integrated in either the STB 106, the display device 108, or both.

In an exemplary embodiment, the content signal may be a cable television signal complying with the American National Standard Society of Cable Telecommunication Engineers standard ANSI/SCTE July 2006 titled "Digital Transmission Standard for Cable Television," the contents of which are incorporated herein by reference in its entirety. The content signal also may comply with other standards and may be communicated by the network 104.

The network 104 may be a wired network, a wireless network, and/or combinations thereof. The network 104 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 104 may include, without limitation, telephone line, fiber optics, IEEE Ethernet 802.3, a wide area network ("WAN"), a local area network ("LAN"), or a global network such as the Internet. Also, network 104 may support, an Internet network, a wireless communication network, a cellular network, or the like, or any combination thereof. Network 104 may further include one, or any number of the exemplary types of networks mentioned above operating as a stand-alone network or in cooperation with each other. Network 104 may utilize one or more protocols of one or more network elements to which it is communicatively coupled. Network 104 may translate to or from other protocols to one or more protocols of network devices. Although network 104 is depicted as one network, it should be appreciated that according to one or more embodiments, network 104 may comprise a plurality of interconnected networks, such as, for example, a service provider network, the Internet, a broadcaster's network, a cable television network, corporate networks, and home networks.

The network 104 may transport the content signal or various messages in analog or digital form from the server 102 to the STBs 106. The network 104 also may transport analog or digital messages from the STBs 106 to the server 102. In an exemplary embodiment, at least a portion of the network 104 may comply with the Telecommunication Union Telecommunication Standard (ITU-T) Recommendation G.983.1 titled "Broadband Optical Access Systems based on Passive Optical Networks (PON)," January 2005, the contents of which are incorporated herein by reference in its entirety. The network 104 also may comply with other standards. In an exemplary embodiment, the network 104 may communicate with the STBs 106 using three separate carriers, where one of the carriers may exchange data using a data communication session, such as, but not limited to, Internet Protocol, another carrier may communicate content signals to the STBs 106, and the last carrier may receive messages from the STBs 106. The network 104 also may be or include a cable television network, a satellite network, fiber optics, combinations thereof, or other networks capable of distributing a content signal from the server 102 to the STB 106, and exchanging information, messages, requests, etc., between the server 102 and one or more STBs 106 via the network 104.

The user premises 110 may each include a STB 106 and a display device 108. FIG. 1 illustrates a STB 106 and a display device 108 at user premises 110. In an exemplary embodiment user premises 110 and the devices included therein may correspond to a subscriber to a television or multimedia content provider. A single user premise 110 may include multiple STBs 106 and multiple display devices 108. The STB 106 also may be remotely located from the display device 108.

In an exemplary embodiment, the STB 106 may be a hardware device that may receive a content signal from the network 104, may cause display of the content signal at the display device 108, and may communicate messages to the network 104. For example, the STB 106 may cause display of a cable television signal at the display device 108, which may be, for example, a television set or computer monitor. In another example, the STB 106 may be a computer and the display device 108 may be a computer monitor. It is noted that the STB 106 and the display device 108 are depicted and described as being separate devices in FIG. 1. The STB 106 and the display device 108, however, may be combined into a single unit. The functions performed by the STB 106 and the display device 108 also may implemented in a mobile phone, a wireless device, or any other device that may communicate via the network 104.

It is noted that system 100 illustrates a simplified view of various components included in a content distribution system, and that other hardware devices and software not depicted may be included in the system 100. It is also noted that the system 100 illustrates only a single server 102 and a single network 104. It will be appreciated that multiple instances of these devices may be used.

Figure 2:
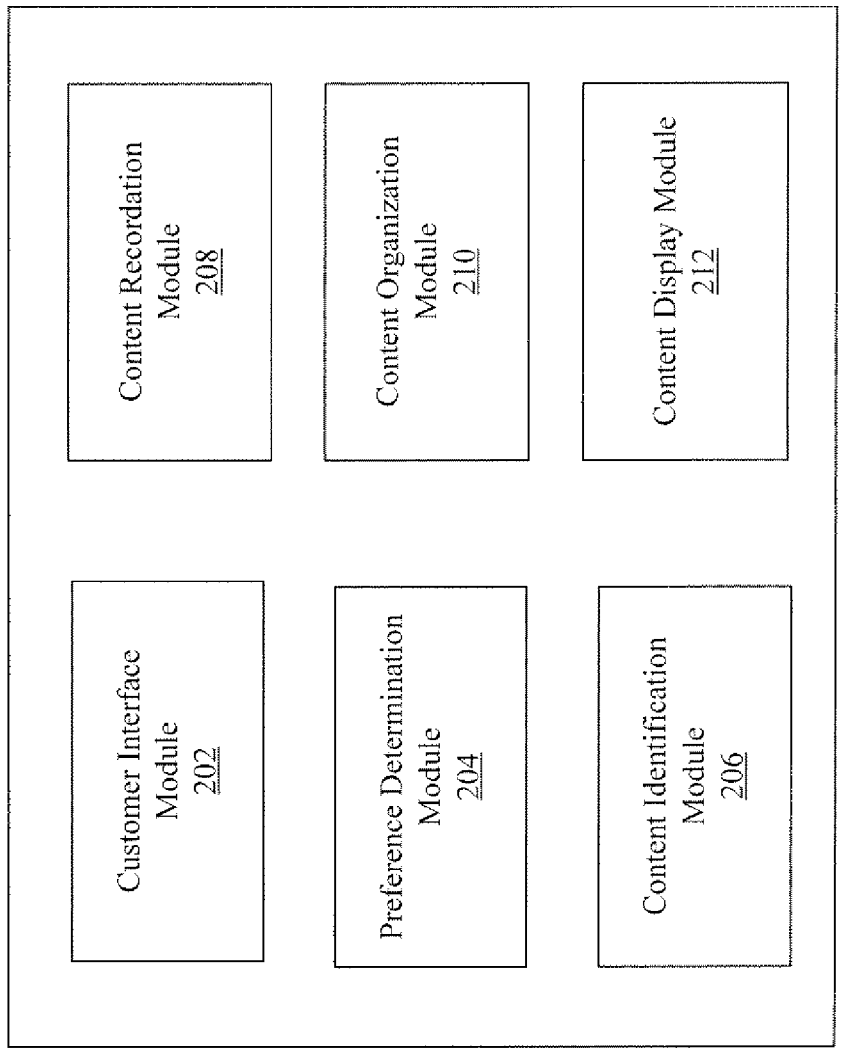
FIG. 2 is a block diagram illustrating exemplary modules of a hardware component of a system for storing and facilitating view of sneak peeks of video content in accordance with exemplary embodiments.

FIG. 2 is a block diagram illustrating exemplary modules of a hardware component of a system for storing and facilitating view of sneak peeks of video content in accordance with exemplary embodiments. In an exemplary embodiment, the STB 106 depicted in FIG. 1 may include a customer interface module 202, a preference determination module 204, a content identification module 206, a content recordation module 208, a content organization module 210, and a content display module 212. Modules 202, 204, 206, 208, 210, and 212 are exemplary. The function of modules 202, 204, 206, 208, 210, and 212 may be performed at other modules remote or local to STB 106 or server 102, and the modules 202, 204, 206, 208, 210, and 212 may be combined or separated.

Customer interface module 202 may exist as a software application executing on a STB, and it may provide the signal representative of the visual manifestation of the interface to a display device. Customer interface module 202 may allow a subscriber to select sneak peek clips for viewing. Customer interface module 202 may further allow a subscriber to select content from which sneak peek clips may be generated. Customer interface module 202 may further allow a subscriber to record a show in its entirety after viewing the sneak peek. Customer interface module 202 may further provide allow the subscriber to make a decision on whether a given sneak peek clip should remain stored in a digital video storage medium, or be deleted.

Customer interface module 202 may work in conjunction with all of the other modules. Customer interface module 202 may work in conjunction with preference determination module 204 in that the user selections, which may be made via interfaces provided by the customer interface module 202, are used to determine the viewing preferences of a subscriber. Customer interface module 202 may work in conjunction with content identification module 206 if a user selects an advertisement via the customer interface module 202, the content identification module 206 may take that received selection and determine the content that the advertisement was for (e.g., the show, the channel, the time slot information, etc.). Customer interface module 202 may work in conjunction with content recordation module 208 in that the user first selects the content to be recorded via the customer interface module 202 and the content recordation module 208 may record this information and may store the recorded information on a storage medium configured to store video information. Customer interface module 202 may work in conjunction with content organization module 210 in that the content being organized by content organization module 210 may be received via the customer interface module 202. Customer interface module 202 may work in conjunction content display module 212 in that the interface presented to the subscriber may be presented via the content display module.

Customer interface module 202 may be configured to display graphical user interfaces allow for user input. By way of non-limiting example, the graphical user interface of FIG. 3 may be displayed by the customer interface module 202. Also customer interface module 202 may be configured to accept user input. As a non-limiting example, the user input may come from a remote control device such as the remote control device 112 depicted in FIG. 1.

In exemplary embodiments, preference determination module 204 may exist as a software application on a STB or a server. In some embodiments, the processing steps associated with preference determination module 204 may be shared by an STB or a server. Preference determination module may perform algorithmic processing to determine a subscriber's viewing preferences based on the content that the subscriber selects for viewing. For example, a subscriber who views the show "CSI" on a frequent basis may be provided with a recommendation for the show "Cold Case." This is a simple example provided for illustrative purposes only and should be construed in a limiting manner. The functions performed by preference determination module 204 may be turned off by the subscriber. Thus, if a subscriber does not like the content suggested by the preferences determination module, the subscriber may have the option of turning off this functionality.

Content identification module 206 may identify the content associated with a user-selected advertisement. For example, a subscriber may be watching a television show and an advertisement may comes on for a new series. The new series may be on the same channel the subscriber is viewing or it may be for a series on a different channel. The subscriber may select the advertisement. The selection of the advertisement may be facilitated by the customer interface module 202. The content identification module may determine information regarding the content of the show that was being advertised. The functions of the content identification module 206 may be performed at a STB. The functions of the content identification module 206 may be performed at a server. In some embodiments, both a server and a STB may be utilized for the purpose of identifying the content appearing in a user-selected advertisement.

Content recordation module 208 may work in conjunction with the content identification module 206 in that once content has been identified, the content recordation module may utilize the identifying information to record content. Content recordation module 208 may work in conjunction with content organization module 210 in that the recorded content may have certain identifying metadata associated with it that may then be utilized by the content organization module 210 to organize the recorded content on a storage medium configured to store digital video data such that the recorded content may be easily retrieved by a subscriber attempting to access the information via the customer interface module 202.

Content display module 212 may include software applications and hardware devices which may be needed to display both interface information on a display device and also content information on a display device.

Figure 3:
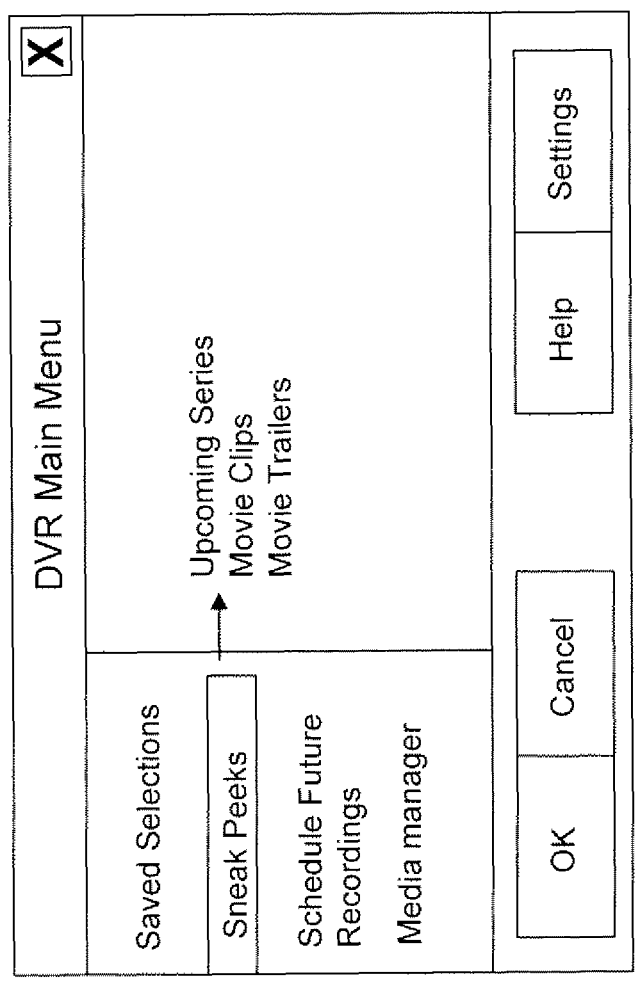
FIG. 3 illustrates the appearance of a DVR main menu of a user interface in accordance with exemplary embodiments.

FIG. 3 illustrates the appearance of a DVR main menu of a user interface in accordance with exemplary embodiments. The DVR main menu may provide a subscriber with a way to navigate through the sneak peek clips stored on the subscriber's DVR. The subscriber may utilize the graphical user interface to find the desired sneak peak selection. The subscriber may then select the clip for viewing. After the subscriber has viewed the sneak peek clip, the user may be provided with the option of viewing the content in full. This option may be presented to the user with a navigable graphical user interface window.

Figure 4A:
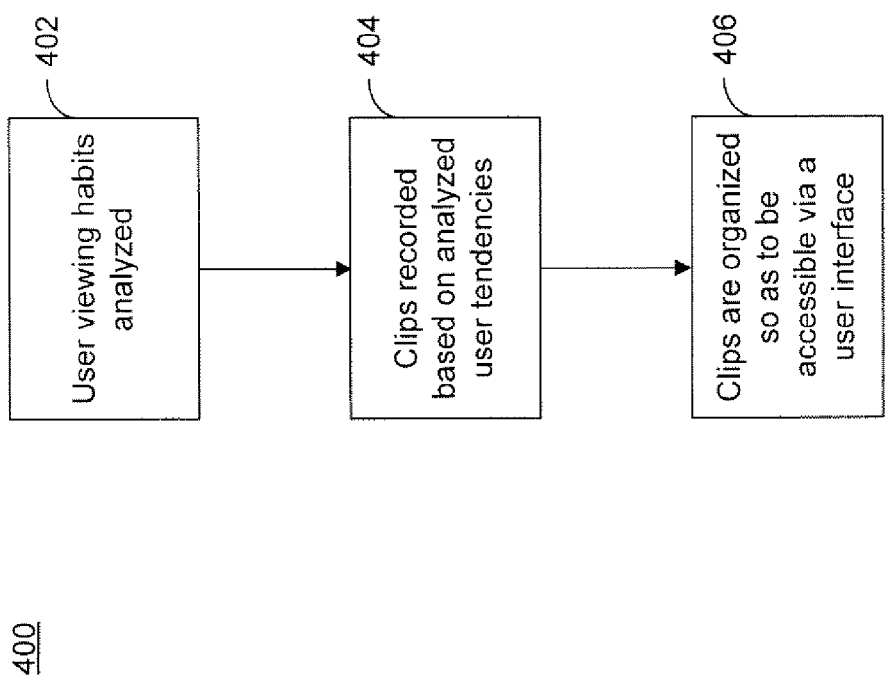
FIG. 4(a) is a flowchart illustrating a method for recording and storing sneak peek content based on determined customer preferences in accordance with exemplary embodiments.
Figure 4B:
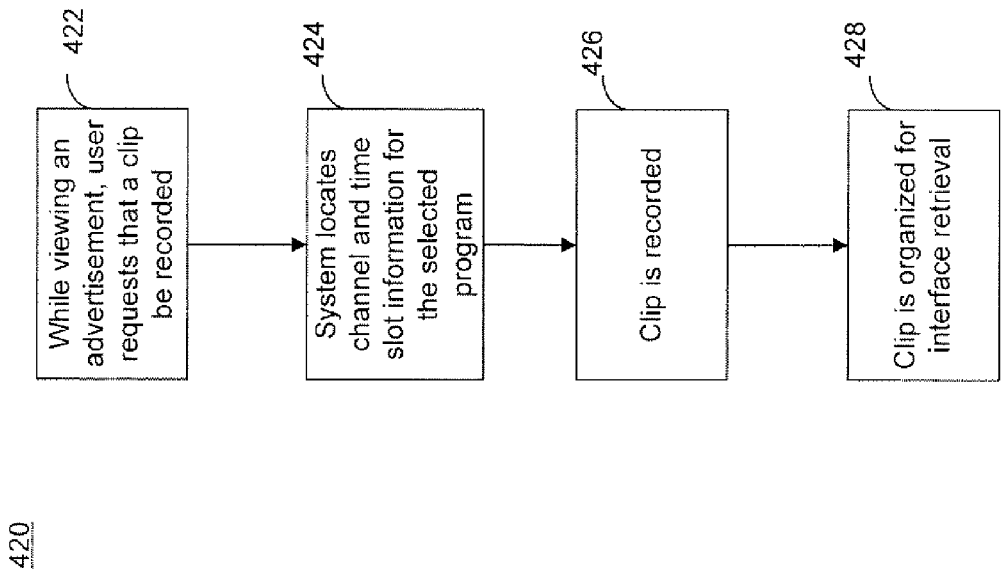
FIG. 4(b) is a flowchart illustrating a method for recording and storing sneak peek content based on real-time user selection of displayed advertisements in accordance with exemplary embodiments.

FIG. 4(*a*) is a flowchart illustrating a method 400 for recording and storing sneak peek content based on determined customer preferences in accordance with exemplary embodiments. In an exemplary embodiment, as illustrated at box 402, subscriber's viewing habits may be analyzed to determine the types of content they may be interested in viewing. The analyzing of subscriber viewing habits and the subsequent determination of content for sneak peek recording may be performed by a preference determination module, such as the preference determination module 204 illustrated at FIG. 2. The preference determination module may include hardware or software systems that may reside at a subscriber's STB, such as STB 106 illustrated in FIG. 1 or at a server, such as server 102 illustrated in FIG. 1. The preference determination module may include hardware or software systems that may reside on both the server 102 and the STB 106.

As illustrated in box 404, sneak peek clips may be recorded based on the user tendencies analyzed at box 402. Box 406 illustrates that the recorded clips may be organized on the subscriber's DVR in a manner that allows the clips to be retrieved by a user navigating a graphical user interface.

FIG. 4(*b*) is a flowchart illustrating a method 420 for recording and storing sneak peek content based on real-time user selection of displayed advertisements in accordance with exemplary embodiments. As box 422 illustrates, a subscriber in the process of viewing a program, may see an advertisement for a different program (e.g., an upcoming series, an on-demand movie, a pay-per-view movie, etc.) that the subscriber may be interested in viewing in the future. The subscriber may select this advertisement in any number of ways. By way of non-limiting example, the system may be configured such that the subscriber can make a selection via remote control which will cause a navigable user interface window to pop up on the screen. The user interface window may give the user the ability to select the program shown in the advertisement for later sneak peek previewing. As an additional non-limiting example, the subscriber's remote control may be configured with a dedicated button on a remote control that, when pressed during a commercial, signals the system to record a sneak peak preview clip of the content In some embodiments, the user can choose to record the series or episode to DVR whenever it is going to be broadcast. This action of recording the episode or series will not create a sneak peek preview clip in DVR, but will record the entire show.

As illustrated in box 424, after the subscriber requests that a sneak peek clip be recorded, the channel and time slot information for the program may be identified. The identification of the channel and time slot information for a selected program may be performed by a content identification module, such as content identification module 206 illustrated in FIG. 2. As illustrated in box 426, once the program is identified, a sneak peek clip may be recorded. The sneak peek clip, once recorded, may be stored in the subscriber's DVR and organized in a manner that allows the clips to be retrieved by a user navigating a graphical user interface. This is illustrated in box 428.

Figure 4C:
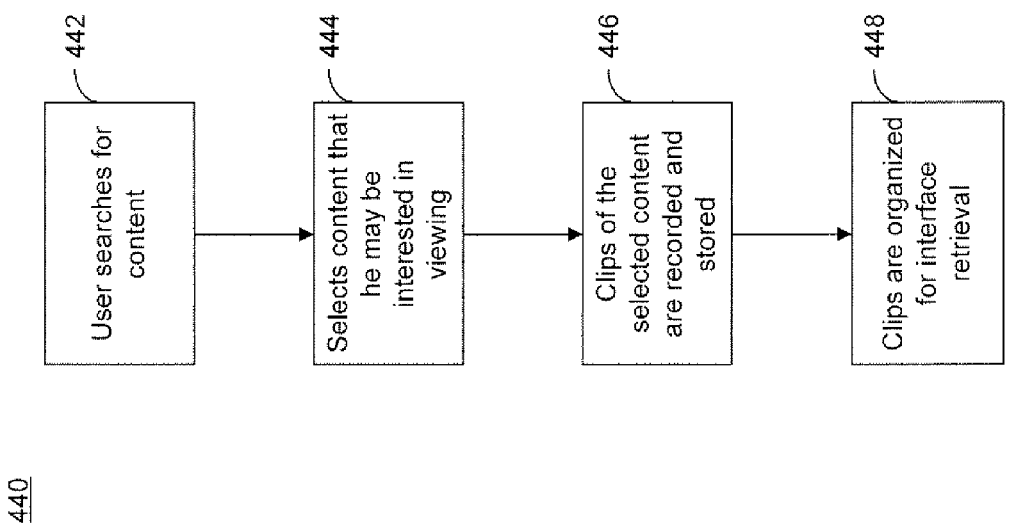
FIG. 4(c) is a flowchart illustrating a method for recording and storing sneak peek content based on determined customer preferences in accordance with exemplary embodiments.

FIG. 4(c) is a flowchart illustrating a method 440 for recording and storing sneak peek content based on a user's search for specific content in accordance with exemplary embodiments. As illustrated in box 442, a subscriber may search for specific content that they may be interested in viewing. A subscriber may search for specific content through an on-screen interface which may allow the user to locate content by perform keyword searches. For example, an on-screen interface may allow the subscriber to perform a keyword search for a given actor, actress, or director. An on-screen interface may also allow a subscriber to locate content by browsing available content. For example, an on-screen interface may allow a user to browse the most popular selections or new releases.

If the subscriber finds content that the subscriber may interested in previewing, the subscriber may select that content. This is illustrated in box 444. Box 446 illustrates that the clips of the selected may then be recorded and stored. The sneak peek clip, once recorded, may be stored in the subscriber's DVR and organized in a manner that allows the clips to be retrieved by a user navigating a graphical user interface. This is illustrated at box 448.

Figure 5:
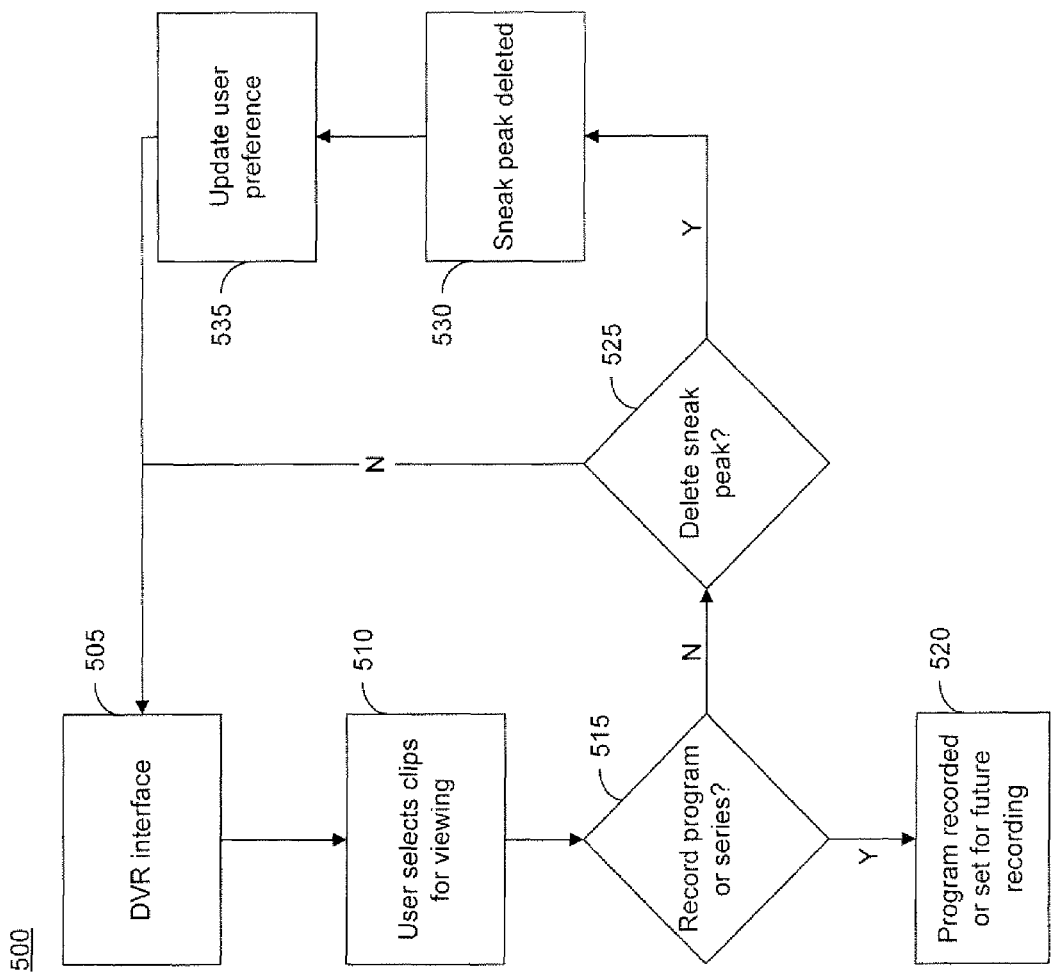
FIG. 5 is a flowchart illustrating a method for retrieving and viewing stored sneak peek clips in accordance with an exemplary embodiment.

FIG. 5 is a flowchart illustrating a method 500 for retrieving and viewing stored sneak peek clips in accordance with an exemplary embodiment. At box 505, a subscriber may be presented with an on-screen DVR interface. Such an interface may resemble the interface depicted in FIG. 3. The DVR interface may include a selection to retrieve sneak peek clips stored on the subscriber's DVR. The user may navigate through the interface and then, as is illustrated in box 410, the may select a clip for viewing.

After viewing the sneak peek clip, the subscriber may be prompted with navigable interface window, which may give the subscriber the option of recording the entire program, or even the entire series, onto the DVR. If the subscriber selects the option for the program or series to be recorded in its entirety, as is illustrated at box 520, then the show will be scheduled for recording. If the subscriber does not opt to have the program or series recorded in its entirety, the subscriber may be prompted with a selection to delete the sneak peak from the DVR. The subscriber may have decided that the program or series was something that they would find not enjoyable, in which case they may opt to delete the sneak peek. In some embodiments, the sneak peek may be deleted automatically after a set length of time (e.g., one day, one week, etc.). In some embodiments, the user may be able to configure the settings that dictate if the sneak peeks are automatically deleted, and if so, how long they should be stored before deletion. If the subscriber deletes the sneak peek, a preference determination module, such as preference determination module 204 depicted in FIG. 2, may use this indication as additional information in determining what type of content the subscriber may be most interested in viewing. This is illustrated at box 535.

Whether or not the subscriber opts to delete the sneak peek clip from their DVR storage, the subscriber may again be presented with the DVR main menu. The user may then repeat the process described above for other stored sneak peek clips.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising: recording, upon selection of an advertisement by a subscriber, at least one video content clip on a subscriber's storage medium configured to store video content, the advertisement being distinct from the at least one video content clip; providing an electronic signal to a display device, wherein the electronic signal provided to the display device comprises information representative of the at least one recorded clip on the storage medium, and is configured to cause display of an interface which is configured to facilitate user selection of the at least one recorded clip; receiving an electronic signal, wherein the received electronic signal includes information identifying the at least one recorded clip; providing an electronic signal to a display device, wherein the electronic signal provided to the display device comprises information representing the identified recorded clip, wherein the interface is further configured to allow for the subscriber to indicate whether a video content should be recorded in its entirety after viewing the recorded clip previously recorded on the subscriber's storage medium upon selection of the advertisement by the subscriber.

2. The method according to claim 1, wherein the recorded clip is a continuous excerpt of the video content.

3. The method according to claim 1, wherein the recorded clip is a trailer for the video content.

4. The method according to claim 1 further comprising automatically storing suggested video content for the subscriber, wherein the stored content is based at least in part on a determination of the subscriber's viewing habits.

5. The method according to claim 1, further comprising:
   receiving an electronic signal indicating that the video content should be recorded in its entirety;
   recording the video content in its entirety on the subscriber's storage medium configured to store video content.

6. The method according to claim 1, further comprising:
   receiving an electronic signal indicating that the video content should not be recorded in its entirety;
   sending an electronic signal to the display device, wherein the electronic signal is configured to cause display of a deletion interface,
   wherein the deletion interface allows for the subscriber to delete the recorded clip from the subscriber's storage medium.

7. The method according to claim 4 comprising:
   analyzing the video content requested by a subscriber to determine the subscriber's viewing habits.

8. A non-transitory computer readable media comprising code to perform the acts of the method of claim 1.

9. A method, comprising: receiving an electronic signal comprising information for an advertisement of video content selected by a viewer while the advertisement is playing; upon selection of the advertisement by the viewer, identifying the video content being advertised in the selected advertisement and recording at least one clip of the advertised video content on a viewer's storage medium configured to store video content, the advertisement being distinct from the at least one clip; providing an electronic signal to a display device, wherein the electronic signal provided to the display device comprises information representative of the at least one recorded clip on the storage medium; receiving an electronic signal, wherein the received electronic signal includes information identifying one of the at least one recorded clip of the advertised video content; providing an electronic signal to a display device, wherein the electronic signal provided to the display device comprises information representing the identified recorded clip; receiving an electronic signal indicating whether a video content should be recorded in its entirety after the viewer views the identified recorded clip previously recorded on the viewer's storage medium.

10. The method according to claim 9, wherein the selected advertisement is being displayed on a display device at the time when it is selected.

11. The method according to claim 9, wherein the identifying of the video content comprises identifying a show being advertised by the advertisement.

12. The method according to claim 9, wherein the identifying of the video content comprises identifying a channel playing a show being advertised by the advertisement.

13. The method according to claim 9, wherein the identifying of the video content comprises identifying a time slot for a show being advertised by the advertisement.

14. A non-transitory computer readable media comprising code to perform the acts of method claim 9.

15. A system, comprising: a client device communicatively coupled to a network; a processor communicatively coupled to the client device, wherein the processor is configured to: record, upon selection of an advertisement by a subscriber, at least one video content clip on a client's storage medium configured to store video content, the advertisement being distinct from the at least one video content clip; provide an electronic signal to a display device, wherein the electronic signal provided to the display device comprises information representative of the at least one recorded clip on the storage medium, and is configured to cause the display of an interface which is configured to facilitate user selection of the at least one recorded clip; receive an electronic signal, wherein the received electronic signal includes information identifying the at least one recorded clip; and provide an electronic signal to a display device, wherein the electronic signal provided to the display device comprises information representing the identified recorded clip, wherein the interface is further configured to allow for the subscriber to indicate whether a video content should be recorded in its entirety after viewing the recorded clip previously recorded on the client's storage medium.

16. The system according to claim 15, wherein the recorded clip is a continuous excerpt of the video content.

17. The system according to claim 15, wherein the recorded clip is a trailer for the video content.

18. The system according to claim 15 wherein the processor is further configured to:
analyze the video content requested by a subscriber to determine the subscriber's viewing habits;
select suggested video content for the subscriber, wherein the selection is based at least in part on the determination of the subscriber's viewing habits.

19. The system according to claim 15, further comprising:
receiving an electronic signal indicating that the video content should be recorded in its entirety;
recording the video content in its entirety on the client's storage medium configured to store video content.

20. The system according to claim 15, further comprising:
receiving an electronic signal indicating that the video content should not be recorded in its entirety; and
sending an electronic signal to the display device, wherein the electronic signal is configured to cause display of a deletion interface,
wherein the deletion interface allows for the subscriber to delete the recorded clip from the client's storage medium.

21. A system comprising: a client device communicatively coupled to a network; a processor communicatively coupled to the client device, wherein the processor is configured to: receive an electronic signal comprising information identifying a video content; record, upon selection of an advertisement by a subscriber, at least one clip of the identified video content on a client's storage medium configured to store video content, the advertisement being distinct from the at least one clip; provide an electronic signal to a display device, wherein the electronic signal provided to the display device comprises information representative of the at least one recorded clip on the storage medium; receive an electronic signal, wherein the received electronic signal includes information identifying the at least one recorded clip; provide an electronic signal to a display device, wherein the electronic signal provided to the display device comprises information representing the identified recorded clip; and receive an electronic signal, wherein the received electronic signal includes information indicating whether the identified video content should be recorded in its entirety after the identified recorded clip is displayed on the display device.

22. A device comprising: a customer interface module configured to provide electronic signals to a display device, wherein the electronic signals are configured to cause the display of navigable user interfaces comprising at least one advertisement for video content; a preference determination module configured to analyze a subscriber's viewing habits and, based on this analysis, provide suggested video content to advertise to the subscriber; a content identification module configured to identify information regarding a video content; a content recordation module configured to record a clip of the video content on a subscriber's storage medium upon selection of the at least one advertisement by the subscriber, the at least one advertisement being distinct from the clip of the video content; a content organization module configured to organize recorded video content such that it may be accessed by the subscriber via a user interface displayed on a display device; and a content display module configured to display user interface information and video content information on a display device, wherein the customer interface module is further configured to allow for the subscriber to indicate whether the video content should be recorded in its entirety after viewing the clip of the video content previously recorded on the subscriber's storage medium.

* * * * *